United States Patent
Duch et al.

(10) Patent No.: US 11,619,304 B2
(45) Date of Patent: Apr. 4, 2023

(54) METHOD OF MANUFACTURING A WHEEL HUB BEARING UNIT FOR VEHICLES AND ASSOCIATED WHEEL HUB BEARING UNIT

(71) Applicant: Aktiebolaget SKF, Gothenburg (SE)

(72) Inventors: Daniele Duch, San Gillio (IT); Marco Romanetto, Pianezza (IT)

(73) Assignee: AKTIEBOLAGET SKF

( * ) Notice: Subject to any disclaimer, the term of this patent is extended or adjusted under 35 U.S.C. 154(b) by 106 days.

(21) Appl. No.: 17/066,334

(22) Filed: Oct. 8, 2020

(65) Prior Publication Data

US 2021/0108727 A1 Apr. 15, 2021

(30) Foreign Application Priority Data

Oct. 15, 2019 (IT) .................. 102019000018692

(51) Int. Cl.
| | |
|---|---|
| *F16J 15/28* | (2006.01) |
| *F16C 19/16* | (2006.01) |
| *F16J 15/3232* | (2016.01) |
| *B33Y 80/00* | (2015.01) |
| *B23K 26/342* | (2014.01) |
| *B22F 10/00* | (2021.01) |

(52) U.S. Cl.
CPC .............. *F16J 15/28* (2013.01); *F16C 19/16* (2013.01); *F16J 15/3232* (2013.01); *B22F 10/00* (2021.01); *B23K 26/342* (2015.10); *B33Y 80/00* (2014.12); *F16C 2326/02* (2013.01)

(58) Field of Classification Search
CPC .... F16J 15/00; F16J 15/28; F16J 15/16; F16J 15/50; F16J 15/52; F16J 15/3204; F16J 15/3236; F16C 2326/00; F16C 2326/02; B33Y 80/00; B23K 26/342; B22F 10/00

USPC .......................................................... 277/349
See application file for complete search history.

(56) References Cited

U.S. PATENT DOCUMENTS 6,463,983 B1 * 10/2002 Lang .................. E06B 9/54
160/23.1

FOREIGN PATENT DOCUMENTS

| EP | 2725245 | 4/2014 | |
|---|---|---|---|
| EP | 3546772 | 10/2019 | |
| JP | 2004144255 | 5/2004 | |
| JP | 2004144255 A | * 5/2004 | ............ F16C 33/103 |
| JP | 2009180366 | 8/2009 | |

(Continued)

OTHER PUBLICATIONS

Austenitic Stainless steel (Year: 2008).*
International Search Report for corresponding Italian Patent Application No. 201900018692 dated Jun. 23, 2020.

*Primary Examiner* — Nathan Cumar
(74) *Attorney, Agent, or Firm* — Reed Smith LLP

(57) ABSTRACT

A wheel hub bearing unit including an outer ring, rolling bodies and an inner ring provided with a flange at a first end thereof, the inner ring being made with a sliding surface for sealing lips of a sealing device arranged so as to protect the rolling bodies, defined by a metal insert formed integrally with the first end and arranged astride a base portion of the flange and a portion of the first end immediately adjacent to the base portion of the flange. The metal insert has a thickness of between 0.2 and 2 mm and being made, using a material different from the material with which the inner ring is manufactured and consisting of an austenitic stainless steel, by means of additive manufacturing.

17 Claims, 3 Drawing Sheets

(56) References Cited

FOREIGN PATENT DOCUMENTS

KR       20160108058       9/2016
KR       20160108058 A  *  9/2016  ......... F16C 33/7876

* cited by examiner

METHOD OF MANUFACTURING A WHEEL HUB BEARING UNIT FOR VEHICLES AND ASSOCIATED WHEEL HUB BEARING UNIT

CROSS REFERENCE OF RELATED APPLICATIONS

This application is based on and claims priority to Italian Application No. 102019000018692, filed Oct. 15, 2019, under 35 U.S.C. § 119, the entire contents of which are incorporated herein by reference.

FIELD

The present disclosure relates to a method of manufacturing a wheel hub bearing unit for vehicles, and to an associated wheel hub bearing unit which is particularly compact and has an outboard sealing device, i.e. sealing device arranged towards the outside of the vehicle, with a long working life. The present disclosure also relates to a component of a wheel hub bearing unit for vehicles including a flanged inner ring of a rolling bearing.

BACKGROUND

As is known, the wheel hub bearing units of vehicles are composed, generally, of an inner rolling bearing ring having a first flanged end, an outer rolling bearing ring mounted on the inner ring on the opposite side to the first flanged end of the inner ring, a plurality of rolling bodies arranged between the inner ring and the outer ring so that they are relatively rotatable with a small amount of friction, and at least one sealing device arranged to protect the rolling bodies on the side of the first flanged end of the inner ring.

A vehicle wheel is mounted, during use, on the flanged end of the inner ring, while the outer ring, which may be more or less flanged, is fixed onto/inside a suspension pillar of a vehicle.

BRIEF DESCRIPTION OF THE DRAWINGS

The embodiments in accordance with this disclosure will now be described with reference to the accompanying drawings which illustrate two non-limiting examples of embodiment thereof, in which.

DETAILED DESCRIPTION

Sealing lips of the sealing device slide on a smooth and corrosion-resistant surface. For this purpose, the sealing device is typically composed of two facing screens, i.e. a first screen, carrying an elastomer element provided with elastically deformable sealing lips, and a second screen, made of stainless steel or sheet metal lined with a protective material, mounted facing the first screen and on respective sliding surfaces which are engaged by the sealing lips.

This solution is satisfactory, but has a number of drawbacks. Firstly it is relatively bulky in the axial direction, while instead, in many applications, the spaces available are limited. The use of a second screen with a complex form only partially solves the problem of the axial dimensions, but is costly. Secondly, in the case of the solution with two screens there is a risk of relative movement of the two screens and/or with respect to the rolling bearing rings with the consequent loss of sealing effect and risk of damage to the rolling bodies.

The elimination of the second screen would result at the moment in the direct frictional contact of the sealing lips on the inner ring, the sealing device being fastened to the outer ring, in the zone where the flange is attached, with consequent rapid wear of the sealing lips and the risk of corrosion of the sliding surfaces of the sealing lips.

Embodiments in accordance with this disclosure provide a method of manufacturing a wheel hub bearing unit for vehicles and an associated wheel hub bearing unit provided with a flanged inner ring, which do not have the drawbacks of the prior art and which are both reliable and low-cost and also capable of reducing the axial dimensions of the wheel hub bearing unit.

On the basis of the exemplary embodiments, therefore, a method of manufacturing a wheel hub bearing unit as well as an associated wheel hub bearing unit and a flanged inner ring of this unit are provided.

Figure 1:
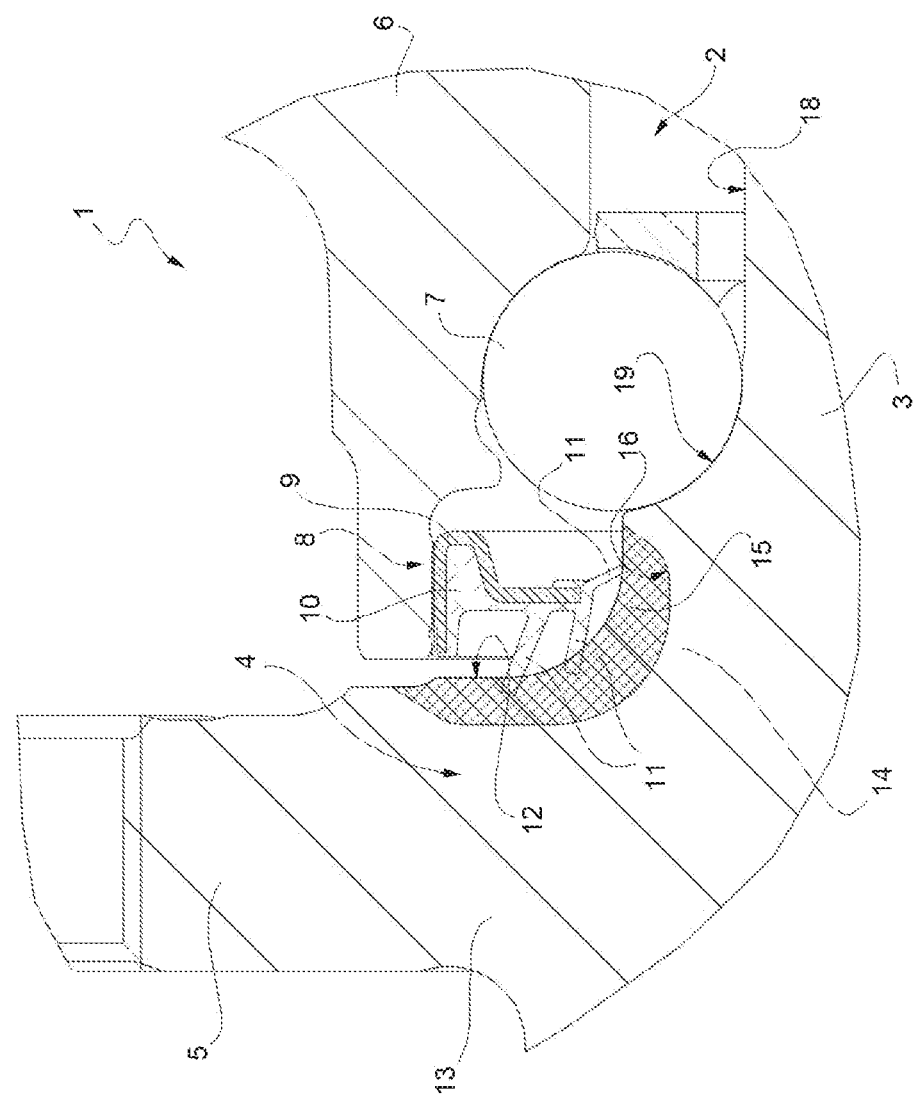
FIG. 1 shows in schematic form an elevation and radially sectioned view of a wheel hub bearing unit for vehicles according to embodiments in accordance with this disclosure which, for simpler illustration, has parts removed.

With reference to FIG. 1, in it 1 denotes overall a wheel hub bearing unit for vehicles comprising a rolling bearing 2 in turn comprising an inner ring 3 having its first end 4 provided radially on the outside with a flange 5, an outer ring 6 and a plurality of rolling bodies 7 arranged between the outer ring 6 and the inner ring 3 so that they are relatively rotatable.

The wheel hub bearing unit 1, which for the sake of simpler illustration is shown only in schematic form and with the outer ring 6 and inner ring 3 truncated, also comprises at least one sealing device 8 mounted integrally on the outer ring 6 and comprising a rigid annular screen 9 which is shaped, viewed in radial cross-section, as required with the necessary folded zones needed to strengthen the cross-section, for example with a substantially L-shaped form or, as in the non-limiting example of embodiment shown, substantially in the form of a "7".

The rigid annular screen 9 has, integrally mounted thereon, an elastomeric annular sealing element 10 provided with a plurality of elastically deformable sealing lips 11 configured to engage, preferably with contact, against a radially outer sliding surface or counter-face of the first end 4 of the inner ring 3, so as to form together therewith a friction seal (or labyrinth seal, in the case where on or more of the lips 11 do not make engaging contact with the surface 12).

According to embodiments in accordance with this disclosure, the inner ring 3 of the wheel hub bearing unit 1 for vehicles is made as one piece, at its first end 4, with the radially outer flange 5 and is also provided between a base portion 13 of the flange 5 and a portion 14 of the first end 4, immediately adjacent to the flange 5, with a metal insert 15 which extends astride, on the same side, the base portion 13 of the flange 5 and the portion 14 of the first end 4 of the inner ring 3 immediately adjacent to the base portion 13 of the flange.

The metal insert 15 occupies completely, in this embodiment, a radially outer recess 16 of the inner ring 3 which extends radially on the outside both above the base portion 13 of the flange 5 and above the portion 14 of the first end 4 of the inner ring 3 immediately adjacent thereto.

The metal insert 15, according to embodiments in accordance with this disclosure, is made with a material different from the material from which the inner ring 3 is made and, in particular, a metal or metal alloy which is resistant to corrosion and has a relatively low friction coefficient.

According to embodiments in accordance with this disclosure, the sliding surface 12 is defined by the metal insert 15, which is annular and is formed integrally as one piece with the first end 4 of the inner ring 3, in the position described above, so as to occupy entirely the recess 16, which is also annular and formed on a radially outer side surface 18 of the inner ring 3 on which respective raceways 19 for the rolling bodies 7 are also formed (only one of said raceways is shown, the other one being arranged on the known ring part 3 truncated for simpler illustration).

The sliding surface 12 defined and bounded by the metal insert 15 forms the radially outer side surface of the end 4 and therefore forms part of the side surface 18, forming the section thereof which is closest to the flange 5.

The metal insert 15 has a thickness ranging between 0.2 and 2 mm and preferably between 0.4 and 0.8 mm, said measurements corresponding, in this embodiment, to the depth of the recess 16.

The metal insert is formed, according to embodiments in accordance with this disclosure, by a stainless steel, in particular an austenitic stainless steel, and even more particularly by an austenitic stainless steel containing silicon, of the type standardized for welding; for example, according to an embodiment of the invention, the metal insert 15 is made of an AISI316L steel with a silicon content equal to about 1% by weight and a low carbon content, which must be equal to or less than 0.03%. This material represents a preferred, but non-limiting, embodiment of the invention.

The Si content is more generally between 0.8 and 1% by weight, of the type standardized for wire welding, so as to be able to obtain the metal insert 15 by means of additive manufacturing.

From the above, it is therefore clear that embodiments in accordance with this disclosure also relate to a method of manufacturing a wheel hub bearing unit 1 for vehicles, comprising a rolling bearing 2 in turn comprising an inner ring 3 having its first end 4 provided radially on the outside with a flange 5, an outer ring 6 and a plurality of rolling bodies 7 arranged between the outer ring and the inner ring so that they are relatively rotatable, and at least one sealing device 8 mounted integrally on the outer ring 6 and provided with a plurality of sealing lips 11 configured to engage by means of sliding on the radially outer surface 12 of the first end 4 of the inner ring 3.

The method according to embodiments in accordance with this disclosure comprises the steps of:

a) manufacturing the outer ring 6 and the inner ring 3, the latter being made as one piece with the flange 5, for example by means of forging or casting, in a rough configuration, forming, during this step or subsequently by means of machining, on the radially outer surface 18 of the inner ring 3 a radially outer recess 16 arranged astride, on the same side, a base portion 13 of the flange 5 and a portion 14 of the first end 4 of the inner ring 3 immediately adjacent to the base portion 13 of the flange 5. During this step, the recess 16 is formed so as to extend both above the base portion 13 of the flange 5 and above the portion 14 of the first end 4 of the inner ring 3 immediately adjacent thereto;

b) progressively filling at least the whole of the recess 16 with an insert 15 made by means of additive manufacturing of a metal or metal alloy resistant to corrosion and having a relatively low friction coefficient; during this step the insert 15 may also extend outside of the recess 16, for example over a part of the surface 18 or heightwise beyond the edge of the surface 18;

c) machining the metal insert 15 so as to form a sliding surface 12 for the sealing lips 11, the sliding surface 12 being formed curved and so as to connect seamlessly the base portion 13 of the flange 5 with the first end 4 of the inner ring 3 and with the surface 18, flush therewith;

d) mounting the sealing device 8 on the outer ring 6 and mounting the outer ring 6 on the inner ring 3, on the opposite side to the flange 5, with the arrangement of the rolling bodies 7 in between, so that the sealing lips 11 cooperate with the sliding surface 12.

The metal insert 15 is preferably manufactured by means of SLM (Selective Laser Manufacturing) technology and in any case using a metallic material in powder form with an average particle size of 90 microns.

The metal insert 15 is made of a stainless steel.

The metal insert is made in particular of an austenitic stainless steel.

The metal insert is made even more particularly of a stainless steel AISI316L with Si content ranging between 0.8 and 1%, of the type standardized for welding.

The metal insert 15 finally is made so to have in the finished condition, and therefore after being machined and in the region of the sliding surface 12, a thickness of between 0.2 and 2 mm and preferably between 0.4 and 0.8 mm, said measurements corresponding, in the embodiment shown in FIG. 1, to the depth of the recess 16.

Figure 2:
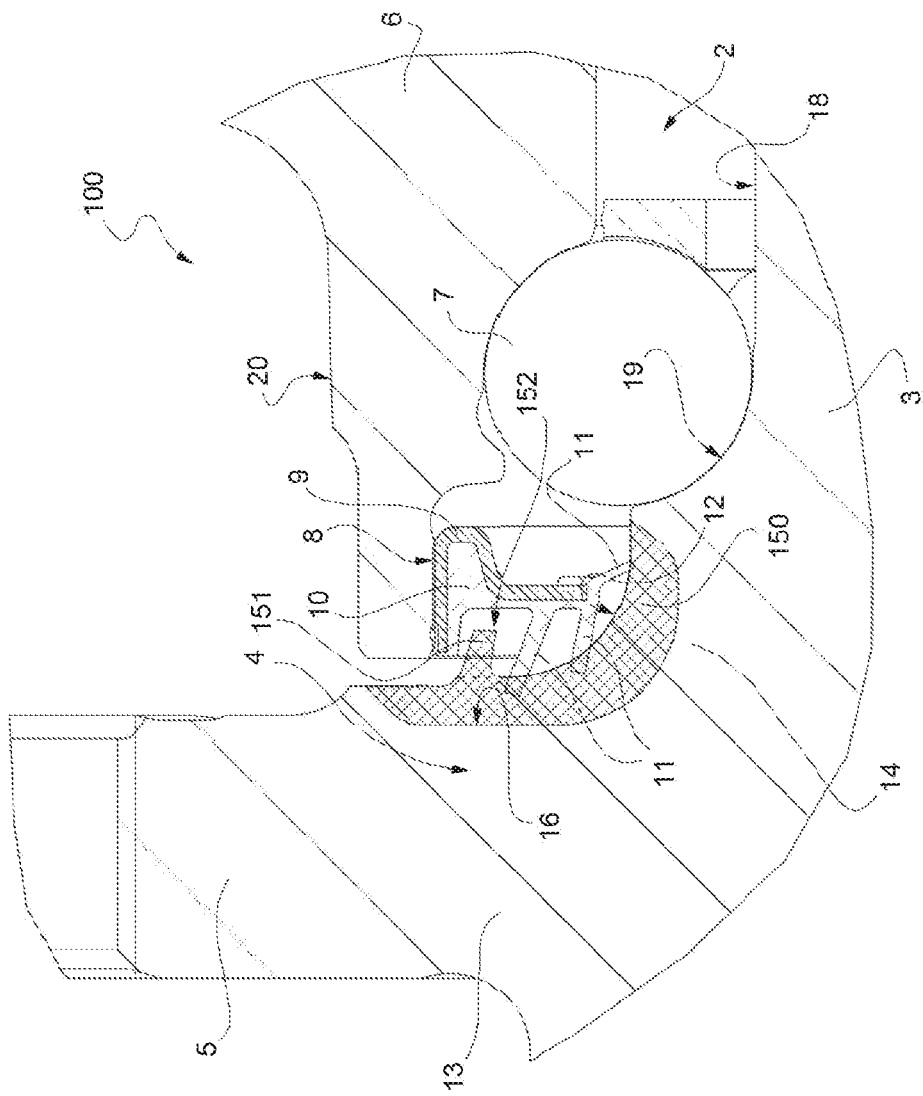
FIG. 2 shows in schematic form a same elevation and radially sectioned view of a wheel hub bearing unit for vehicles according to according to embodiments in accordance with this disclosure, which, for simpler illustration, has parts removed.

With reference now to FIG. 2, where details which are similar to or the same as those already described are indicated for the sake of simplicity by the same reference numbers, said figure shows a wheel hub bearing unit 100 for vehicles comprising a rolling bearing 2 in turn comprising an inner ring 3 having a first end 4 thereof provided radially on the outside with a flange 5, an outer ring 6 and a plurality of rolling bodies 7 arranged between the outer ring 6 and the inner ring so that they are relatively rotatable.

In this case also, a recess 16 is formed radially on the outside on the side where the side surface 18 is situated, said recess extending, however, over the whole of the base portion 13 of the flange 5 until substantially flush with a radially outer surface 20 of the outer ring 6.

The recess 16 is occupied by a metal insert 150 which fills it completely and which, differently from the insert 15, is deposited, in the manner already described, by means of additive manufacturing, progressively so as to extend axially and radially outside of the recess 16. Then the insert 150 is machined so as to form the sliding surface 12 and form moreover, on the base portion 13 of the flange 5 also a projection 151 configured to extend axially inside the outer ring 6 and radially on the inside thereof, immediately radially on the outside of the radially outermost sealing lip 11, adjacent and parallel to which it is formed. The projection 151 may also be formed directly by means of additive manufacturing already in its definitive form and configuration, without the need for machining.

The projection 151 defines and forms, together with the radially outer lip 11 and with the screen 9, an additional labyrinth seal 152 arranged radially on the outside of the other radially innermost lips and for protection of the sliding surface 12, radially on the outside thereof.

The deposition of the metal is able to satisfy the market demand for sealing lips which slide on stainless steel material and use a more compact and low-cost sealing design.

A further advantage may be obtained in the case where the deposition of the material may be used in order to create the labyrinth 152 for the seal.

Figure 3:
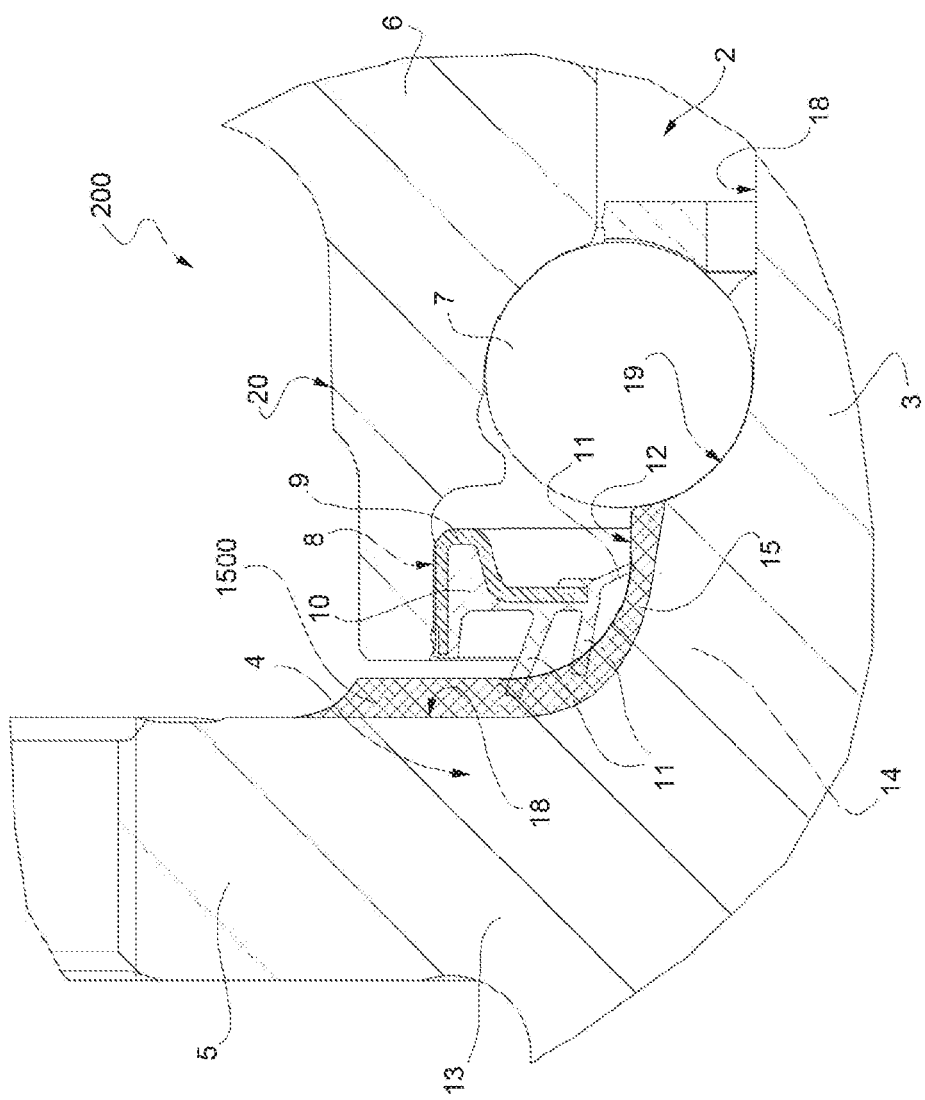
FIG. 3 shows according to embodiments in accordance with this disclosure.

With reference now to FIG. 3, where details which are similar to or the same as those already described are indicated for the sake of simplicity by the same reference numbers, said figure shows a wheel hub bearing unit 200 for vehicles comprising a rolling bearing 2 in turn comprising an inner ring 3 having its first end 4 provided radially on the outside with a flange 5, an outer ring 6 and a plurality of roiling bodies 7 arranged between the outer ring 6 and the inner ring so that they are relatively rotatable.

In this case, however, there is no recess 16 present, while a metal insert 1500 is provided, this extending, however, directly on the radially outer side surface 18, radially on the outside both above the base portion 13 of the flange 5 and substantially as far as a point flush with a radially outer surface 20 of the outer ring 6, and above the whole portion 14 of the first end 4 of the inner ring 3 immediately adjacent to the flange 5 and, in the example shown, towards the raceways 19.

The insert 1500 is deposited on the side surface 18 (or part thereof) in the manner already described, by means of additive manufacturing, progressively so as to extend axially and radially on the outside of the flange 5 and the portion 14, directly on the rough-formed or previously machined side surface 18. Then the insert 1500 is machined so as to form the sliding surface 12.

During this step, according to a possible further variant not shown, a projection 151, configured as described above for the variant of FIG. 2, may also be formed on the insert 1500, opposite the base portion 13 of the flange 5. The projection 151 may also be formed directly by means of additive manufacturing already in its definitive form and configuration, requiring then only finish-machining, in the same way, moreover, as the whole of the insert 1500. In all the embodiments described, the inserts 15, 150 and 1500 are obtained by means of laser additive manufacturing using metal powders with an average particle size of between 70 and 100 microns, and preferably equal to 90 microns, applying a laser power of 400 Watts and a relative translation speed of laser and machining surface equal to 10 mm/s, until a "rough" insert with a minimum thickness of 0.5 mm is obtained.

Following deposition and cooling thereof, the insert 15, 150, 1500 is again machined—since without machining it would not have a surface finish suitable for forming the sliding surface 12—until it has a working thickness of between 0.2 and 2 mm.

Therefore the solution described offers the following advantages:

1) possibility of using well-known and compact sealing designs which previously did not function owing to the high level of corrosion of the surface of the lips of sealing device formed by a single screen;

2) obtaining a labyrinth 152 formed in the flanged inner ring 3, avoiding any type of handling, assembly and position control;

3) complete freedom of application of coatings owing to the absence of silicon particles which, in the known two-screen sealing designs, resulted from the need to arrange between the screen mounted on the inner ring 3 and the ring itself silicone pastes for increasing the sealing action.

In addition to the exemplary embodiments, as described above, it is to be understood that numerous further variants exist. It must also be understood that said embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

What is claimed is:

1. A method of manufacturing a wheel hub bearing unit for vehicles comprising a rolling bearing, wherein the rolling bearing comprises an inner ring having its first end provided, radially on the outside, with a flange, an outer ring and a plurality of rolling bodies arranged between the outer ring and the inner ring so that they are relatively rotatable, and at least one sealing device mounted integrally on the outer ring and provided with a plurality of sealing lips configured to engage on a radially outer surface of the first end of the inner ring; wherein the method comprises:
   a) manufacturing the outer ring and the inner ring, wherein the inner ring comprises one piece with the flange;
   b) progressively forming on a radially outer surface of the inner ring an insert made by additive manufacturing of a metal or metal alloy resistant to corrosion and having a relatively low friction coefficient; the insert being arranged astride, on the same side, a base portion of the flange and a portion of the first end of the inner ring immediately adjacent to the base portion of the flange and radially inside the outer ring, the insert extending both above the base portion of the flange and above the portion of the first end of the inner ring immediately adjacent thereto, the insert axially overlapping the outer ring;
   c) machining the metal insert so as to form a sliding surface for the sealing lips, the sliding surface being curved in axial cross-section and seamlessly connecting the base portion of the flange with the first end of the inner ring;
   d) mounting the sealing device on the outer ring and mounting the outer ring on the inner ring, on the opposite side to the flange, with the arrangement of rolling bodies in between, so that the sealing lips cooperate with the sliding surface.

2. The method according to claim 1, wherein during step a), a recess is also formed on the radially outer surface of the inner ring, said recess being arranged astride, on the same side, a base portion of the flange and a portion of the first end of the inner ring immediately adjacent to the base portion of the flange, the recess extending both above the base portion of the flange and above the portion of the first end of the inner ring immediately adjacent thereto;
   and wherein step b) is carried out by forming the insert by additive manufacturing directly inside the recess until it at least fills it completely, optionally overflowing also axially and/or radially so as to project from the recess.

3. The method according to claim 2, wherein step b) further comprises forming a projection configured to extend axially inside the outer ring and radially on an outside of an outermost one of the sealing lips.

4. The method according to claim 1, wherein the metal insert is manufactured by selective laser manufacturing (SLM) technology using metallic powders having an average particle size of between 70 and 100 micron and applying a power of 400 W with a relative translation speed of 10 mm/sec.

5. The method according to claim 1, wherein the metal insert is made of a stainless steel.

6. The method according to claim 5, wherein the metal insert is made of an austenitic stainless steel.

7. The method according to claim 1, wherein the metal insert is made of stainless steel AISI316L having an Si content ranging between 0.8 and 1%, of the type standardized for welding.

8. The method according to claim 1, wherein the metal insert has, after its application step, a minimum thickness of 0.5 mm and after machining a thickness of between 0.2 and 2 mm and preferably between 0.4 and 0.8 mm.

9. The method according to claim 1, wherein step b) progressively forming on a radially outer surface of the inner ring the insert made by means of additive manufacturing further comprises forming a projection configured to extend axially inside the outer ring and radially on an outside of a radially outermost one of the sealing lips.

10. A wheel hub bearing unit for vehicles, comprising:
a rolling bearing comprising:
an inner ring having its first end provided, radially on the outside, with a flange;
an outer ring;
a plurality of rolling bodies arranged between the outer ring and the inner ring so that they are relatively rotatable; and
at least one sealing device mounted integrally on the outer ring and provided with a plurality of sealing lips configured to engage against a radially outer sliding surface of the first end of the inner ring, the sliding surface being curved in axial cross-section, wherein the sliding surface is defined by a metal insert formed integrally as one piece with the first end of the inner ring, the metal insert being arranged astride, on the same side, a base portion of the flange and a portion of the first end of the inner ring immediately adjacent to the base portion of the flange and radially inside the outer ring, the metal insert axially overlapping the outer ring, the metal insert having a thickness of between 0.2 and 2 mm; the metal insert being made of a material different from the material with which the inner ring is manufactured and comprises a metal or metal alloy resistant to corrosion and having a relatively low friction coefficient.

11. The wheel hub bearing unit according to claim 10, wherein the metal insert entirely occupies a recess of the inner ring which extends both above the base portion of the flange and above the portion of the first end of the inner ring immediately adjacent thereto.

12. The wheel hub bearing unit according to claim 11, wherein the metal insert further comprises a projection configured to extend axially inside the outer ring and radially on an outside of an outermost one of the sealing lips.

13. The wheel hub bearing unit according to claim 10, wherein the metal insert is made of stainless steel, preferably an austenitic stainless steel.

14. The wheel hub bearing unit according to claim 10, wherein the metal insert is made of stainless steel AISI316L with an Si content ranging between 0.8 and 1%, of the type standardized for welding.

15. The wheel hub bearing unit according to claim 10, wherein the metal insert further comprises a projection configured to extend axially inside the outer ring and radially on an outside of a radially outermost one of the sealing lips.

16. An inner ring of a rolling bearing of a wheel hub bearing unit for vehicles, made as one piece, at its first end, with a radially external flange, comprising:
between a base portion of the flange and a portion of the first end of the inner ring, immediately adjacent to the flange, a metal insert which extends astride, on the same side, the base portion of the flange and the portion of the first end of the inner ring immediately adjacent to the base portion of the flange and configured to extend radially inside an outer ring of the rolling bearing, the metal insert configured to axially overlap the outer ring, the metal insert having a thickness of between 0.2 and 2 mm; the metal insert being made of a material different from the material with which the inner ring is made and consisting of an austenitic stainless steel, the metal insert defining a sliding surface, the sliding surface being curved in axial cross-section.

17. The inner ring of claim 16, wherein the metal insert further comprises a projection configured to extend axially inside the outer ring of the rolling bearing and radially on an outside of a radially outermost one of sealing lips of a sealing device on the outer ring.

* * * * *